(12) United States Patent
Calin et al.

(10) Patent No.: US 9,936,520 B2
(45) Date of Patent: Apr. 3, 2018

(54) METHOD AND APPARATUS FOR WI-FI ACCESS OPTIMIZATION

(71) Applicant: Alcatel-Lucent USA Inc., Murray Hill, NJ (US)

(72) Inventors: Doru Calin, Manalapan, NJ (US); Aliye Ozge Kaya, Chatham, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 318 days.

(21) Appl. No.: 14/675,664

(22) Filed: Mar. 31, 2015

(65) Prior Publication Data

US 2016/0262162 A1 Sep. 8, 2016

Related U.S. Application Data

(60) Provisional application No. 62/129,952, filed on Mar. 8, 2015.

(51) Int. Cl.
| | |
|---|---|
| *H04W 72/08* | (2009.01) |
| *H04L 5/00* | (2006.01) |
| *H04W 74/00* | (2009.01) |
| *H04W 84/12* | (2009.01) |
| *H04W 24/02* | (2009.01) |

(52) U.S. Cl.
CPC .......... *H04W 74/002* (2013.01); *H04W 24/02* (2013.01); *H04W 84/12* (2013.01)

(58) Field of Classification Search
CPC .... H04W 74/002; H04W 84/12; H04W 24/02
See application file for complete search history.

(56) References Cited

U.S. PATENT DOCUMENTS

| | | | | |
|---|---|---|---|---|
| 9,112,599 B2* | 8/2015 | Kwak | ................... | H04B 17/309 |
| 2014/0376453 A1* | 12/2014 | Smith | ............... | H04W 74/0816 |
| | | | | 370/328 |
| 2015/0117333 A1* | 4/2015 | Wang | ........................ | H04L 1/18 |
| | | | | 370/329 |

* cited by examiner

*Primary Examiner* — Gbemileke J Onamuti
(74) *Attorney, Agent, or Firm* — David M. La Bruno

(57) ABSTRACT

A method for controlling a plurality of Wi-Fi clients and a plurality of Wi-Fi Access Points (APs) is provided. The method receives M1 and M2 for the Wi-Fi clients and M3 for the Wi-Fi APs. For a respective Wi-Fi client configured to operate on a channel, M1 is a Received Signal Strength Indication (RSSI) from a serving Wi-Fi AP and M2 is an aggregated level of interference from other than the serving Wi-Fi AP. For a respective Wi-Fi AP, M3 is a level of interference received from other of the Wi-Fi APs operating on the channel. The method generates distributions of M1, M2 and M3, sets a Clear Channel Assessment-Energy Detection (CCA-ED) threshold and a Clear Channel Assessment-Carrier Sense (CCA-CS) threshold based on the distributions of M1, M2 and M3, and transmits the thresholds to the Wi-Fi clients and Wi-Fi APs.

19 Claims, 12 Drawing Sheets

*FIG. 2*

| MODULATION AND CODING SCHEME (MCS) | 802.11a DATA RATE (Mbps) | MINIMUM REQUIRED LinkSNR (dB) @ 10% PER |
|---|---|---|
| BPSK RATE 1/2 | 6 | 14 |
| QPSK RATE 1/2 | 9 | 15 |
| QPSK RATE 3/4 | 12 | 16 |
| 16 QAM RATE 1/2 | 18 | 18 |
| 16 QAM RATE 3/4 | 24 | 22 |
| 64 QAM RATE 2/3 | 36 | 26 |
| 64 QAM RATE 3/4 | 48 | 29 |
| 64 QAM RATE 5/6 | 54 | 31 |

*FIG. 3*

| MODULATION AND CODING SCHEME (MCS) | 802.11n SINGLE STREAM DATA RATE (Mbps) | MINIMUM SENSITIVITY LEVEL (dBm) FOR 20MHz CHANNEL | MINIMUM REQUIRED LinkSNR (dB) @ 10% PER |
|---|---|---|---|
| BPSK RATE 1/2 | 6.5 | −82 | 13 |
| QPSK RATE 1/2 | 13.0 | −79 | 16 |
| QPSK RATE 3/4 | 19.5 | −77 | 18 |
| 16 QAM RATE 1/2 | 26.0 | −74 | 20.95 |
| 16 QAM RATE 3/4 | 39.0 | −70 | 25 |
| 64 QAM RATE 2/3 | 52.0 | −66 | 28.95 |
| 64 QAM RATE 3/4 | 58.5 | −65 | 29.95 |
| 64 QAM RATE 5/6 | 65.0 | −64 | 30.95 |

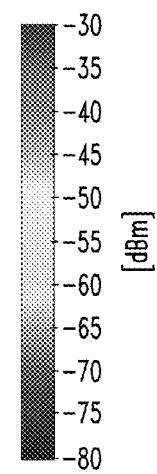

METHOD AND APPARATUS FOR WI-FI ACCESS OPTIMIZATION

BACKGROUND

Field

This application relates generally to communication systems, and, more particularly, to Wi-Fi communication systems.

Related Art

Wi-Fi networks are very challenged in open, high density traffic areas, and in general, in environments requiring high capacity, where a large number of Access Points (APs) need to be deployed in close proximity to each other for capacity reasons. Moreover, the high level of resulting interference pollution is further amplified when some users decide independently to configure their Wi-Fi enabled devices as temporary APs.

This is because the 802.11 Medium Access Control (MAC) with Carrier Sensing Multiple Access and Collision Avoidance (CSMA/CA) is a distributed access mechanism that is known not to perform well in highly congested areas, which are areas in which the medium is almost continuously busy. Highly congested areas are typical to public venues (e.g., airports, concert arenas, stadium environments during sport events).

Optimization of Wi-Fi technologies based wireless access systems typically consists of the performance of Radio Frequency (RF) planning and channel assignment to minimize the likelihood that Wi-Fi APs in proximity of each other select the same channel and create strong interference to each other. While RF planning and channel assignment is a very critical optimization procedure, it has limitations that are easy to understand in open public spaces, such as stadiums during sporting events. Even with a large number of independent non-overlapping channels (e.g., as permitted in the 5 GHz spectrum), the high capacity requirements call for a very tight Wi-Fi AP-to-AP spatial separation, which combined with reflection and bouncing of radio signals may result in significant co-channel interference. The combination of heavy traffic (high activity) and radio pollution drive the Wi-Fi operation towards a less efficient regime (e.g., lower achievable rates and poor overall system performance).

SUMMARY

Described herein are embodiments of apparatuses and methods for enhancing the efficiency of wireless systems relying on Wi-Fi technologies. These embodiments are increasingly relevant to small cells in particular, as Wi-Fi access is becoming an important resource for traffic offloading (especially when tightly integrated with the LTE cellular infrastructure), and given the massive adoption of Wi-Fi based technologies. Small cells are low-cost, low-power base stations designed to improve coverage and capacity of wireless networks, especially when traditional macro cellular networks fall short to satisfy the needs for high data rates and high density usage. For uniformity of service and high capacity requirements, small cells may need to be closely spaced, e.g., within tens of meters of each other and may support multiple technologies simultaneously. Many LTE small cell products are already carrier Wi-Fi enabled.

In particular, the embodiments provided propose methods and apparatus for preventing the Wi-Fi nodes from deferring transmission indefinitely to each other when operating under high levels of congestion (as driven by the built-in collision avoidance mechanism of the MAC). This is achieved through an intelligent tuning of critical MAC parameters, such as Clear Channel Assessment-Energy Detection (CCA-ED) threshold and Clear Channel Assessment-Carrier Sense (CCA-CS) threshold.

As described herein, one embodiment is a method for controlling a plurality of Wi-Fi clients and a plurality of Wi-Fi Access Points (APs) is provided. The method receives M1 and M2 for the Wi-Fi clients and M3 for the Wi-Fi APs. For a respective Wi-Fi client configured to operate on a channel, M1 is a Received Signal Strength Indication (RSSI) from a serving Wi-Fi AP and M2 is an aggregated level of interference from other than the serving Wi-Fi AP. For a respective Wi-Fi AP, M3 is a level of interference received from other of the Wi-Fi APs operating on the channel. The method generates distributions of M1, M2 and M3, sets a Clear Channel Assessment-Energy Detection (CCA-ED) threshold and a Clear Channel Assessment-Carrier Sense (CCA-CS) threshold based on the distributions of M1, M2 and M3.

In one embodiment, the CCA-ED and CCA-CS thresholds are transmitted to the plurality of Wi-Fi clients and the plurality of Wi-Fi APs.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

FIG. 2 presents a Table which provides the linkage between Modulation and Coding Scheme (MCS), achievable data rate and minimum required LinkSNR for the 802.11a technology.

FIG. 3 presents a Table which provides the linkage between Modulation and Coding Scheme (MCS), achievable data rate and minimum required LinkSNR for the 802.11n technology for a single data stream.

Figure 9:
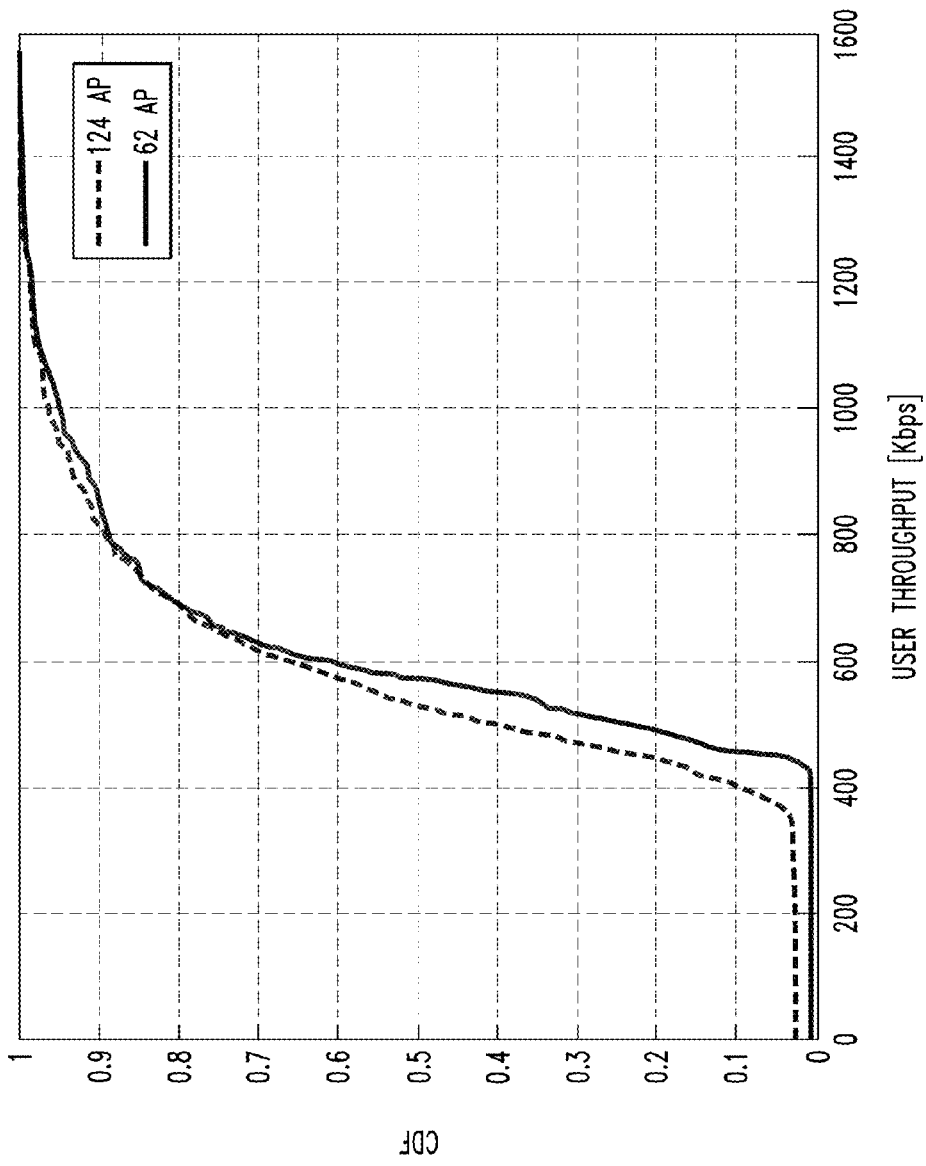

FIG. 9 shows the distribution of achievable user throughputs for the two deployments with 62 and 124 Wi-Fi AP given the parameter setting for CCA-ED=−70 dBm and CCA-CS=−70 dBm.

Figure 10:
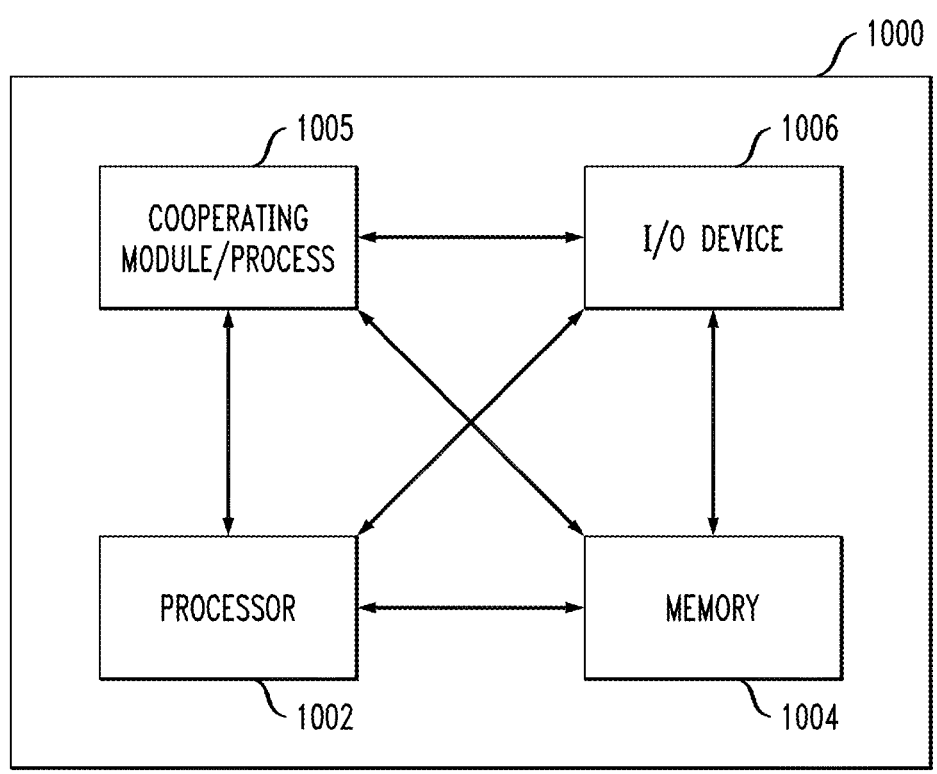

FIG. 10 depicts a high-level block diagram of a computer suitable for use in performing the operations and methodology described herein.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The principles of the invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

For simplicity and consistency, the technological terms used herein refer to the Long Term Evolution (LTE) technology, but can be generalized for any wireless technology. The terms small cell and nodes are synonymous.

Figure 1:
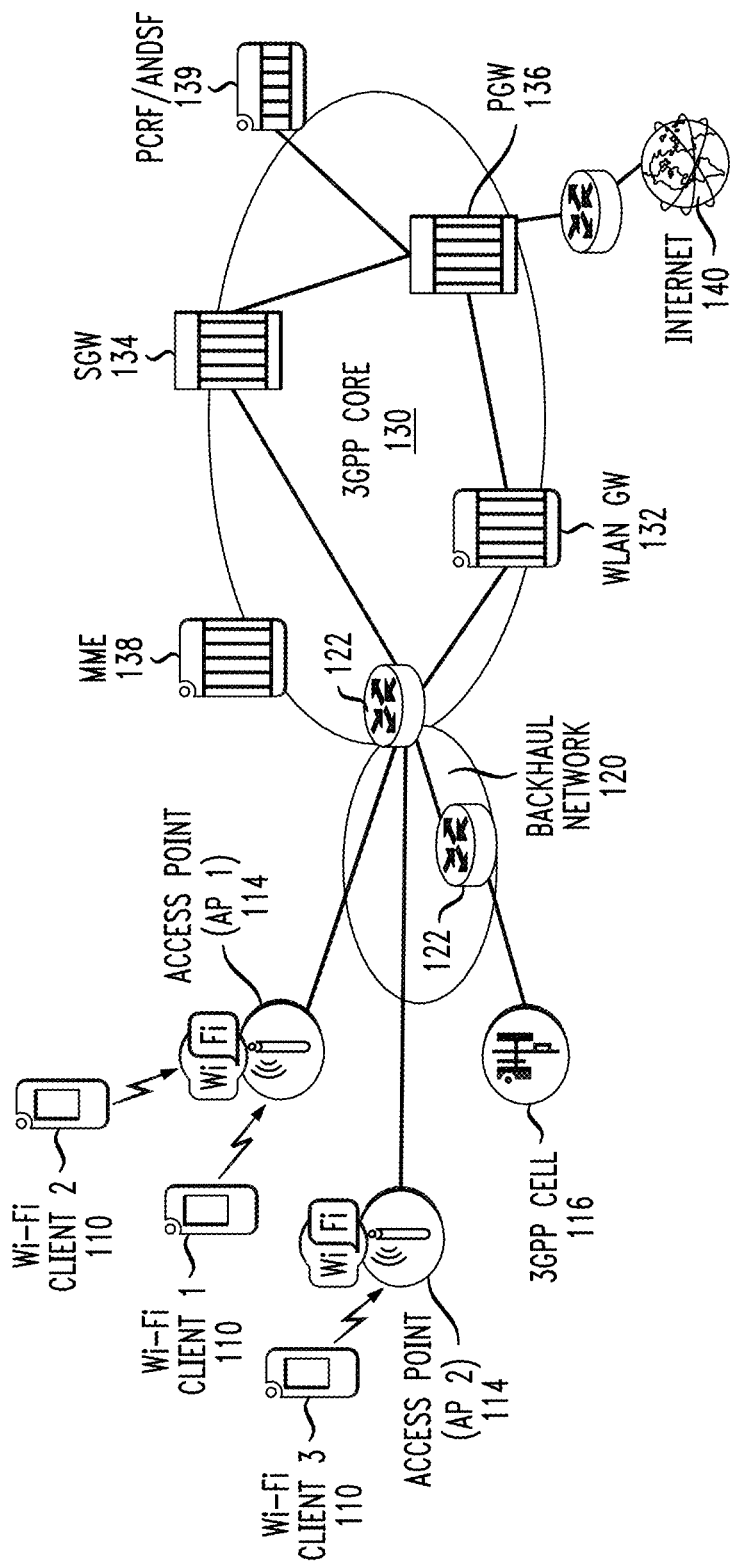
FIG. 1 represents a network architecture with Wi-Fi clients connected to a network via Wi-Fi APs.

FIG. 1 represents an example network architecture in which embodiments of the invention may be deployed. The network includes Wi-Fi clients 110 (e.g., Wi-Fi client1, Wi-Fi client2 Wi-Fi client 3) which are able to communicate with Wi-Fi Access Points 114 (e.g., AP 1, AP2). A Wi-Fi client may be enabled on a User equipment such as a cell phone, smartphone, computing device, computer, etc. Via Wi-Fi APs 114, Wi-Fi clients 112 are able to connect via backhaul network 120 to a 3GPP core 130.

Backhaul network 120 includes one or more routers for communication between a source and a destination. As illustrated, the 3GPP core includes: a wireless local area network (WLAN) gateway (GW) 132; a serving gateway (SGW) 134; a packet data network (PDN) gateway (PGW) 136; a mobility management entity (MME) 138. Although only a single SGW, PGW and MME are shown in FIG. 1, it should be understood that the EPC may include any number of these core network elements The network 100 also includes 3GPP cell 116 which connects via backhaul network 120 to a 3GPP core 130. Although only a 3GPP cell 116 is shown in FIG. 1, it should be understood that the radio network may include any number of 3GPP cells. 3GPP-enabled UEs may connect (not shown) to the core network 130 via the 3GPP cell 116 and backhaul network 120. UEs may have a dual capability for communicating using Wi-Fi and a 3GPP technology (e.g., Long Term Evolution LTE).

The Wi-Fi APs 114 provides Wi-Fi wireless resources and radio coverage for UEs enabled with Wi-Fi clients 112. The 3GPP cell 116 provides 3GPP technology wireless resources and radio coverage for UEs. Any number of UEs may be connected (or attached) to the Wi-Fi APs 114 and 3GPP cell 116.

The 3GPP cell 116 is operatively coupled to the SGW 134 and the MME 138. The SGW 134 routes and forwards user data packets, while also acting as the mobility anchor for the user plane during inter-3GPP cell handovers of UEs. The SGW 134 also acts as the anchor for mobility between $3^{rd}$ Generation Partnership Project Long-Term Evolution (3GPP LTE) and other 3GPP technologies. For idle UEs, the SGW 134 terminates the downlink data path and triggers paging when downlink data arrives for UEs.

The MME 138 is the control-node for the 3GPP technology, and is responsible for idle mode UE paging and tagging procedures including retransmissions. Idle mode may be a mode where the UE has not been used in a threshold amount of time, for example, 10 minutes, 30 minutes or more. The MME 138 is also responsible for choosing a particular SGW for a UE during initial attachment of the UE to the network, and during intra-LTE handover involving Core Network (CN) node relocation. The MME 138 authenticates UEs by interacting with a Home Subscriber Server (HSS) (not shown). Non Access Stratum (NAS) signaling terminates at the MME 138, and is responsible for generation and allocation of temporary identities for UEs. The MME 138 also checks the authorization of a UE to camp on a service provider's Public Land Mobile Network (PLMN), and enforces UE roaming restrictions. The MME 138 is the termination point in the network for ciphering/integrity protection for NAS signaling, and handles security key management. The MME 138 also provides control plane functionality for mobility between LTE and 2G/3G access networks with the S3 interface from the SGSN (not shown) terminating at the MME 138. The MME 138 also terminates the S6a interface to the home HSS for roaming UEs.

Similarly, Wi-Fi APs 114 are operatively coupled to the WLAN GW 132 and the Policy and Charging Rules Function (PCRF)/Access network discovery and selection function (ANDSF) 139. The PCRF/ANDSF 139 assists in UE discovery of non-3GPP access networks (e.g., Wi-Fi, WIMAX) that can be used for data communications in addition to 3GPP access networks, provides the UE with rules policing the connection to these networks and implements those connection rules. The WLAN GW 132 routes and forwards user data packets, while also acting as the mobility anchor for Wi-Fi clients.

The PGW 136 provides connectivity between the UEs (e.g. Wi-Fi Client 1) and the external packet data networks (e.g., the Internet 140) by being the point of entry/exit of traffic for the UE 810. As is known, a given UE may have simultaneous connectivity with more than one PGW for accessing multiple PDNs.

The PGW 136 also performs policy enforcement, packet filtering for UEs, charging support, lawful interception and packet screening, each of which are well-known functions. The PGW 136 also acts as the anchor for mobility between 3GPP and non-3GPP technologies, such as Worldwide Interoperability for Microwave Access (WiMAX) and $3^{rd}$ Generation Partnership Project 2 (3GPP2 (code division multiple access (CDMA) 1× and Enhanced Voice Data Optimized (EvDO)).

Acronyms

AP: Access Point
BPSK: Binary Phase Shift Keying
CCA: Clear Channel Assessment

CDF: Cumulative Distribution Function
CS: Carrier Sense
CSMA/CA: Carrier Sensing Multiple Access/Collision Avoidance
ED: Energy Detection
MAC: Medium Access Control
PHY: Physical Layer
PLCP: Physical Layer Convergence Protocol
QAM: Quadrature Amplitude Modulation
QPSK: Quadrature Phase Shift Keying
RSSI: Received Signal Strength Indication
RF: Radio Frequency
Rx: Received The performance of 802.11 MAC and interference levels are highly dependent on the tuning of MAC parameters, in particular the CCA thresholds. Clear Channel Assessment (CCA) is the operation performed by a Wi-Fi node to determine if the wireless channel is busy or idle. CCA is defined in the IEEE 802.11-2007 standards (IEEE P802.11 Wireless LANs, Normative Text for PHY comments, doc: IEEE 802.11-07/2364rxx, July 2007) as part of the Physical Layer Convergence Protocol (PLCP) layer. It involves two basic functions:

CCA-CS (Carrier Sense): referred to as signal detect CCA, determines the ability of a receiver to detect and decode a Wi-Fi preamble. From the PLCP header field one can infer the duration (in μs) for which the medium will be occupied. When such Wi-Fi preamble is detected the CCA flag is held busy until the end of data transmission.

CCA-ED (Energy Detect): referred to as energy detect, determines the ability of a receiver to detect non-Wi-Fi energy (e.g., could be from devices such as ovens or video cameras which don't follow the CSMA-CA protocol and cause unwanted interference) in the operating channel and back off data transmission. The ED threshold is typically defined to be 20 dB above the minimum Rx sensitivity of the PHY. If the in-band signal energy crosses the ED threshold, CCA flag is held busy until the medium energy is below the threshold.

The sensitivity requirements for CCA have evolved with the evolution of Wi-Fi technologies to wider channel operation.

These two thresholds are predefined in the standard. The IEEE 802.11a standard, for instance, pre-defines CCA-CS threshold=−82 dBm and CCA-ED threshold=−62 dBm, as detailed below:

CCA-CS Threshold is used to detect the start of a valid OFDM packet. Detecting the start of a valid OFDM transmission at a receive signal level equal or above the minimum modulation and coding rate sensitivity, i.e., −82 dBm for 20 MHz, shall cause the CCA-CS to indicate busy with >90% probability within 4 μs for 20 MHz channel spacing.

CCA-ED Threshold is used to detect any energy about a reference level. If the preamble portion was missed, the receiver shall hold the CCA-CS busy for any signal 20 dB above the minimum modulation and coding rate sensitivity, i.e. −62 dBm for 20 MHz channel spacing.

The standards have been evolving to account for new generation of Wi-Fi technologies, and one can notice slight differences between some definitions across references IEEE Std 802.11-07 and IEEE Std 802.11-2012, Local And Metropolitan Area Networks—Specific Requirements. Hence, the CCA definitions according to the IEEE Std 802.11-2012 are provided as complementary information to set the context of the described embodiments.

According to reference IEEE Std 802.11-2012, CCA shall detect a medium busy condition when the CCA-CS mechanism detects a channel busy condition. For the operating classes requiring CCA-ED, CCA shall also detect medium busy condition when CCA-ED detects a channel busy condition.

The definition of CCA-CS definition in IEEE Std 802.11-2012 is as defined above and in IEEE 802.11-07 (i.e., the start of a valid OFDM transmission at a receive level of −82 dBm). In addition, if the preamble was missed, the receiver shall hold the CCA busy for any signal 20 dB above the minimum modulation and coding rate sensitivity (−62 dBm for 20 MHz channel spacing).

CCA-ED is required in some bands for improved spectrum sharing. For OFDM PHY operation with CCA-ED, the thresholds shall be less than or equal to −72 dBm for 20 MHz channel bandwidths.

Hence, the parameters set in standards may evolve with the evolution of the technologies, and the principles of described herein should not be constrained by certain specific values.

Observations:

Receiver noise and receiver sensitivity are device dependent parameters and are not tunable. The receiver sensitivity provides the minimum power level of the desired signal at the receiver for successful decoding. If a received signal is greater than the receiver sensitivity, the node would attempt to decode the signal, even if it is not intended for it. Moreover, any subsequent intended transmission would not be decodable for the duration of the initial transmission. This phenomena, called the strongest last collision, is very likely to happen in open spaces such as stadiums, where each Wi-Fi node can hear the transmission from multiple Wi-Fi APs.

The achievable Wi-Fi rates depend on the specifics of the Wi-Fi technologies.

The required minimum LinkSNR value is driven by the data rate and the following formula:

$$\text{Required minimum LinkSNR} = \text{Minimum SNR} + \text{Fade Margin};$$

where Minimum SNR refers to an ideal state in absence of interference and noise that would yield a system packet error rate (PER) less or equal to 10%; and typical fading margins are 9 to 12 dB, depending on the environment and Wi-Fi technologies.

FIGS. 2 and 3 each present a Table which provide examples of the linkage between Modulation and Coding Scheme (MCS), achievable data rate, and minimum required LinkSNR. FIG. 2 presents a first Table that corresponds to the 802.11a technology. For example, for the BPSK 1/2 Rate MSC, the 802.11a data rate is 6 Mega Bits per second (Mbps) and 14 dB is the minimum required LinkSNR @ 10% PER.

FIG. 3 presents a second Table that corresponds to the 802.11n technology for a single data stream. For example, for the BPSK 1/2 Rate MSC, the 802.11n single stream data rate is 6.5 Mbps, −82 dBm (Decibel-milliwatts) is the minimum sensitivity level for 20 MHz channel, and 13 dB is the minimum required LinkSNR @ 10% PER.

By setting the tunable parameter called CCA-ED threshold higher than the receiver sensitivity and close to the power of the received signal, embodiments disclosed herein are able to prevent that a Wi-Fi device attempts to decode signals which are not intended for it.

A Wi-Fi AP declares the medium as busy and would defer its transmission if the measured energy exceeds the CCA-CS threshold. If the CCA-CS threshold is set very low, many Wi-Fi APs risk to stop transmitting, declaring the medium busy. To keep the CCA-CS and CCA-ED thresholds high, embodiments should ensure that most of the Wi-Fi users get a strong signal from the desired Wi-Fi AP, which is recommended to be done in the first place through a good RF design.

The embodiments herein provide a method and apparatus for intelligent and adaptive tunning the CCA-ED and CCA-CS thresholds at each Wi-Fi device within a Wi-Fi technology based wireless access system.

Referring back to FIG. 1, which illustrates Wi-Fi clients connected to a network via Wi-Fi APs, in one embodiment of the invention, each Wi-Fi client associates with a strongest Wi-Fi AP server that provides the strongest signal in downlink. The Wi-Fi clients measure and report two metrics back to their respective serving Wi-Fi AP: (a) the level of RSSI (Received Signal Strength Indication) measured from the Wi-Fi AP server—named herein metric "M1"—and (b) the aggregated level of interference from the other Wi-Fi APs causing interference (or from the strongest interferer)—named herein metric "M2".

In addition, each Wi-Fi AP measures and reports to a Wi-Fi controller the level of interference received from the other Wi-Fi APs operating on the same channel—named herein metric M3. M3 measured and reported by each Wi-Fi AP may also include any other measurable interference from any interferer received by the Wi-FI AP on the same channel. The Wi-Fi controller is a network node that acts as a central repository of the M1, M2, and M3 information. For example, the WLAN GW may act as the WI-Fi controller described herein.

The frequency of reporting such measurements is determined by the algorithm. For example, reporting of such measurements may occur per fifteen (15) minute interval, thirty minute interval or some other interval of time. The reporting interval may be programmable and may be varied by the network operator from time to time as desired.

While tuning the CCA-ED and CCA-CS threshold values, one may impose minimum acceptable levels for these thresholds, i.e., CCA-ED-Minimum (e.g., −62 dBm for 802.11a, or −72 dBm for 802.11-2012) and CCA-CS-Minimum (e.g., −82 dBm for 802.11a) that will constrain the degrees of freedom for adjusting these thresholds.

Figure 4A:
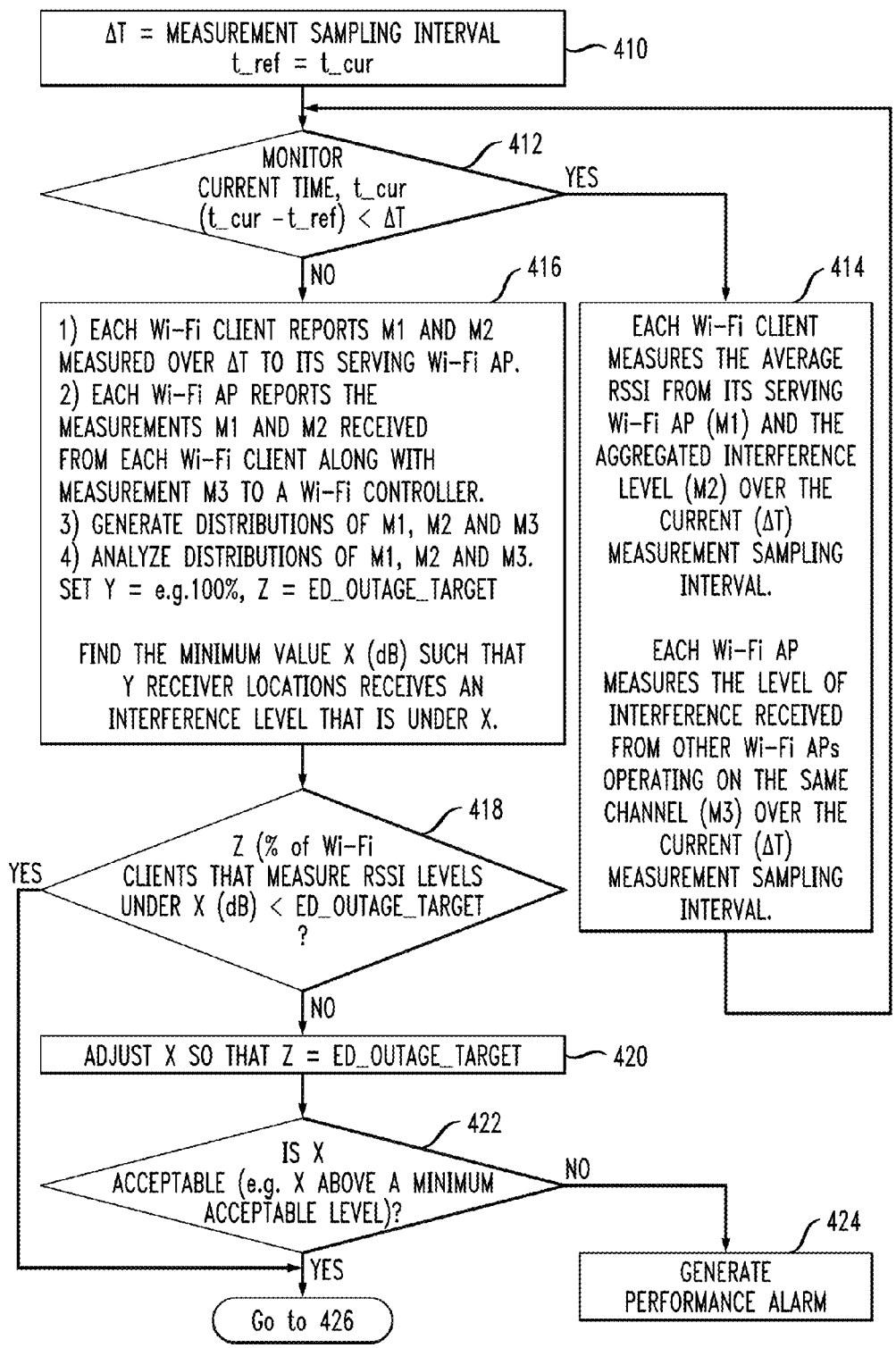
FIGS. 4A-4B are a flow chart illustrating an example method of tuning the tunning the CCA-ED and CCA-CS threshold values according to the principles of the invention.
Figure 4B:
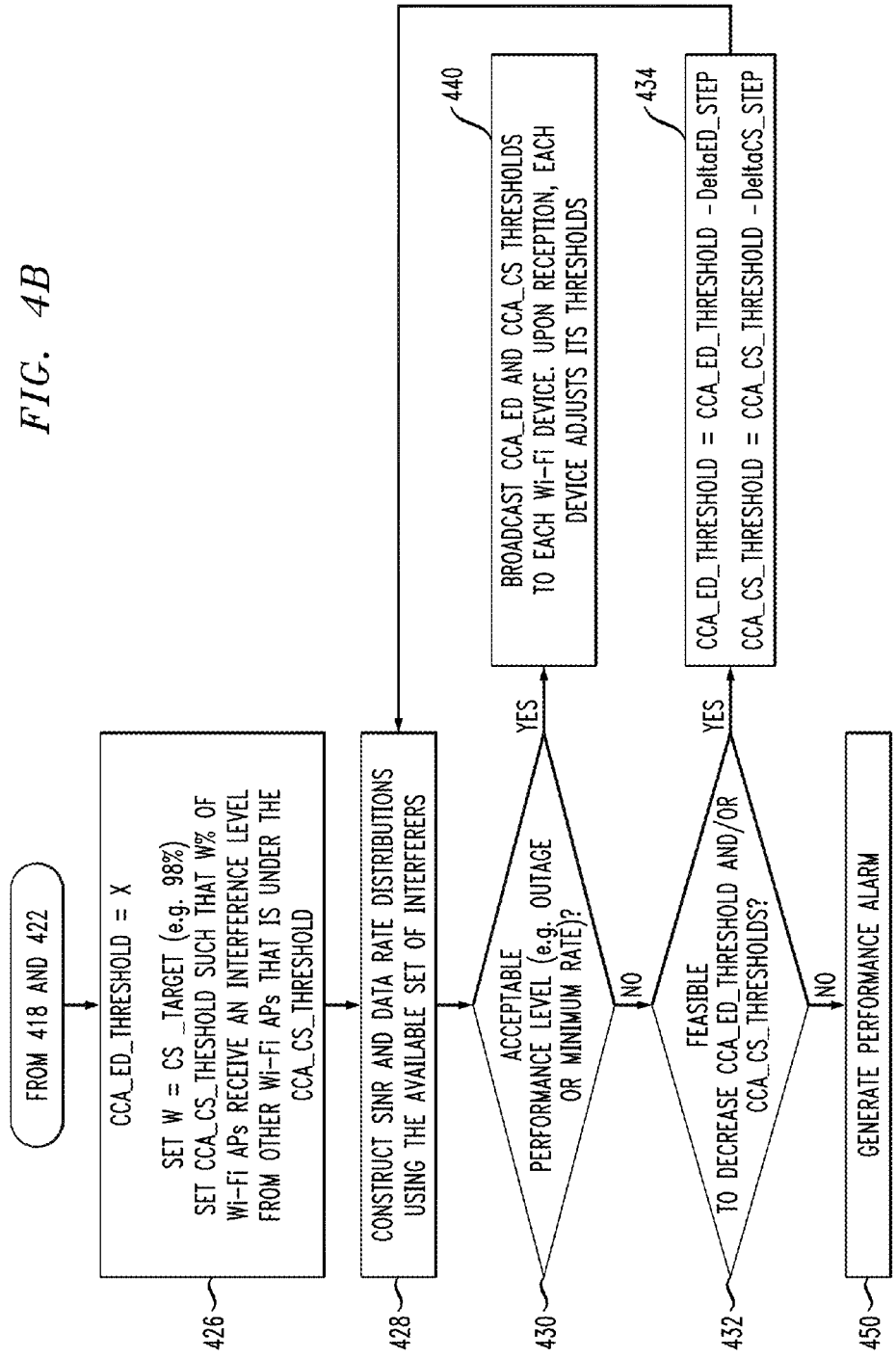

FIGS. 4A-4B are a flow chart illustrating an example method of tuning the tunning the CCA-ED and CCA-CS threshold values according to the principles of the invention.

In one embodiment, the metrics M1 and M2 are averaged values measured by each Wi-Fi AP client over a sampling measurement interval $\Delta T$ and reported to the respective Wi-Fi AP at the end of the interval $\Delta T$. Accordingly, as illustrated in FIG. 4A, at operation 410, the measurement sampling interval $\Delta T$ is set/initialized and a reference time (t_ref) is set/initialized as the current time (t_cur). At operation 412, the current time is monitored to determine whether the measurement sampling interval has expired (e.g., (t_cur−t_ref)<$\Delta T$). If the measurement sampling interval has not expired, at operation 414, each Wi-Fi client continues to measures the RSSI from its serving Wi-Fi AP and the aggregated interference so as to be able to determine the averaged values of RSSI from its serving Wi-Fi AP and the aggregated interference over the current measurement sampling interval (i.e., metrics M1 and M2).

If at operation 412 the measurement sampling interval has expired, the method moves to operation 416. In another embodiment, the tuning of the MAC parameters CCA-ED and CCA-CS thresholds or can be event driven. For example, this can be triggered by a performance alarm (e.g., degradation in system performance). At operation 416, each Wi-Fi client reports the averaged values of RSSI from its serving Wi-Fi AP and the aggregated interference over the current measurement sampling interval (i.e., metrics M1 and M2) to its serving WI-FI AP. In a subsequent step of operation 416, each Wi-Fi AP reports the measurements M1 and M2 received from each supported Wi-Fi client, along with its own measurement M3 to a Wi-Fi controller overseeing the operation of a wireless system composed by a plurality of Wi-Fi APs.

With such information received from each Wi-Fi AP, Wi-Fi controller is able to generate a distribution of the RSSI levels received by the Wi-Fi clients from the strongest Wi-Fi AP servers (M1), a distribution of interference levels to Wi-Fi clients received from other devices operating on the same channel (M2) (e.g., Wi-Fi APs, Wi-Fi clients, and/or any other device generating interfering energy), and a distribution of received power between Wi-Fi APs (M3) and to updated these distributions progressively as the measurements get refreshed.

The Wi-Fi controller analyzes the distributions of M1, M2 and M3 in order to tune intelligently the CCA-ED and CCA-CS thresholds, in accordance with the principles stated herein. In one embodiment, the method finds the minimum value X (dB) such that a percentage, Y, of receiver locations (e.g., Y=100% or some other percentage) receives an interference level that is under X. The variable X is used in the methodology to control the percentage of interferers which can be deliberately ignored by the MAC protocol, and X is intended to be used to set the CCA-ED threshold through a set of iterative steps as explained in the following. Indeed, if the energy received at a particular reference Wi-Fi client from a particular interferer is under the threshold X, by setting the CCA-ED threshold higher than or equal to X in the MAC protocol of the said reference Wi-Fi client, the activity of the interferer will be ignored (i.e., the interferer is treated simply as background noise), and it will not cause the reference Wi-Fi client to be prevented from transmitting anytime it has data in the presence of the said particular interferer (the CCA flag of the reference Wi-Fi client will not be set to busy).

In operation 418, the methodology checks that a small percentage of receivers, Z—say the ED OUTAGE TARGET (e.g., Z=5%)—, measures RSSI levels from the corresponding Wi-Fi AP servers that are under X to minimize outage. This step refers to the interaction between a reference Wi-Fi client and its own reference Wi-Fi AP server. Note that if the energy received to the said reference Wi-Fi client from the said reference Wi-Fi AP server is under the threshold X, if the CCA-ED threshold is higher or equal to X in the MAC protocol of the Wi-Fi client, the transmission of the Wi-Fi AP will be ignored and the Wi-Fi client is allowed to transmit concurrently with the Wi-Fi AP on the same channel. This may cause collisions and eventually leave the Wi-Fi client in outage (its packets may not be received by the serving Wi-Fi AP). Further, the packets that are sent by the said reference Wi-Fi AP to other Wi-Fi clients while the said reference Wi-Fi client is active may not be properly received by the other intended Wi-Fi clients, which may cause temporary outage to other Wi-Fi clients. Consequently, the description is referring to the percentage Z of Wi-Fi clients as those Wi-Fi clients potentially affected by outage. Hence, it is intended to minimize Z.

Thus, it is noted that in operation 418, the value of a variable (Z) utilized by the method is set/established to an initial value that correspond to for example, an energy detection outage target (i.e., ED OUTAGE TARGET).

In operation 418, if Z is found not satisfactory (e.g., Z>5%, i.e. ED_OUTAGE_TARGET=5%), the methodology advances to operation 420.

In operation 420, the methodology adjusts X to bring the level of outage identified at operation 418 to an acceptable level (e.g., Z=ED_OUTAGE_TARGET). Note that the adjustment of X may be constrained such that one cannot go under a minimum acceptable value (e.g. −72 dBm). The adjustment of X can be done in dB steps.

In operation 422, the methodology checks if the value of X found at operation 420 is acceptable (e.g., X is above a minimum acceptable level). If the methodology returns a "No" at operation 422, the methodology jumps at operation 424 for generation of a performance alarm.

At operation 424, the methodology generates a performance alarm which alerts a wireless network administrator. It is up to the network administrator to interpret the alarm. The alarm does not cause the wireless network to collapse, but it provides an indicator to the network administrator that further analysis may be required to deliver the desirable network performance. For instance, if the frequency of such performance alarms is high, the network administrator may consider to re-evaluate the RF design, or to add additional Wi-Fi APs. The methodology is designed to keep running iteratively, as the health of the system is re-evaluated subsequently. For example, the methodology may proceed from operation 424 to 412, having previously in operation 416 set the reference time (t_ref) to the current time (t_cur) with Wi-Fi clients continuing to measure RSSI from its serving Wi-FI AP and aggregated interference level.

At operation 422, if there is a feasible solution for X, the methodology advances to operation 426.

At operation 418, if Z is found satisfactory, the methodology advances to operation 426.

At operation 426, the methodology sets the CCA-ED threshold to the previously determined minimum value X (dB) such that a percentage, Y, of receiver locations receives an interference level that is under X (i.e., set CCA-ED-Threshold=X). Further, the CCA-CS-Threshold is preferably set such that a large percentage of Wi-Fi APs, W, for example the CS-TARGET (e.g., 98%), receive an interference signal from other Wi-Fi APs that is weaker than the CCA-CS threshold. Note that the adjustment of CCA-CS-Threshold may be constrained such that one cannot go under a minimum acceptable value (e.g., −82 dBm).

At this point in the methodology, one particular aspect to which attention should be paid is that while the adjustment of these thresholds pushes the Wi-Fi operation into a more aggressive mode of operation by ignoring transmission from potential interferers, the effect of such interferers transmitting simultaneously on the same channel may become visible through a resulting poorer SINR and poorer data rate, and an increase of packet loss.

Hence, for a given (CCA-ED, CCA-CS) thresholds setting, the methodology may determine the resulting distributions of SINR and distribution of achievable rates.

The choice of these threshold values may include or exclude certain interferers, hence impacting the resulting SINR and data rate distributions. Therefore, from the acceptable range of SINR and data rates, the methodology may determine the acceptable settings for the CCA-ED and CCA-CS thresholds.

Accordingly, in operation 428, using the available set of interferers, the methodology constructs the SINR and data rate distributions. Note that two Wi-Fi devices are interfering with each other if they are both simultaneously active on the same channel.

In operation 430, using the available information such as look-up tables (e.g., Table 1), the methodology determines the percentage of unsatisfied users. In one embodiment, the percentage of unsatisfied users can be represented by the percentage of users not receiving service (e.g., one may not accept more than 2% outage). Referring to FIG. 2, if more than 2% of users operate at a SNR level that is under 14 dB (the required level to achieve a rate of 6 Mbps), this may be an unacceptable design.

In another embodiment, the methodology accepts only a certain percentage of Wi-Fi clients to operate at the minimum data rate (e.g., one may not accept more than 50% of users operating at the minimum rate), while other Wi-Fi clients enjoy rates higher than the minimum rate. Referring to FIG. 2, if more than 50% of users operate at a SNR level under 14 dB (the required level to achieve the minimum rate of 6 Mbps), this may be an unacceptable design.

If the performance is not found acceptable at operation 432, the methodology proceeds to operation 432.

At operation 432, the methodology checks if it would be feasible to decrease the thresholds values for CCA-ED and CCA-CS. A decrease in threshold values will push the system to become less aggressive, toward a more conservative/polite behavior; one implication of a decrease in threshold values is that more interferers will be detected at lower threshold values, which will reduce the likelihood of collision. This does not automatically translate into a better overall performance.

In case of feasibility found at operation 432, the methodology proceeds to operation 434.

In operation 434, the CCA-ED-Threshold may be adjusted down by a settable parameter DeltaED_Step (e.g., 2 dB). Also, CCA-CS-Threshold may be adjusted down by a settable parameter DeltaCS_Step (e.g., 1 dB). Note that either DeltaED_Step or DeltaCS_Step may be zero, indicating that only one threshold may be adjusted at an iteration step. After these adjustments, the methodology loops back to operation 428.

Returning to operation 430, if the conditional test returns a "Yes", the system performs within the acceptable regime, and the methodology proceeds to operation 440.

At operation 440, the determined values of CCA-ED and CCA-CS thresholds are broadcasted to each Wi-Fi device. Subsequently, each Wi-Fi device self-adjusts these thresholds.

Returning to operation 432, if the test condition returns a "No", the methodology proceeds to operation 450 and generates a performance alarm. Operation 450 is analogous to operation 424 though the alarm generated by each operation may have a different code, which may indicate a different severity level. Varying alarms may trigger different actions by the wireless network administrator.

Figure 5:
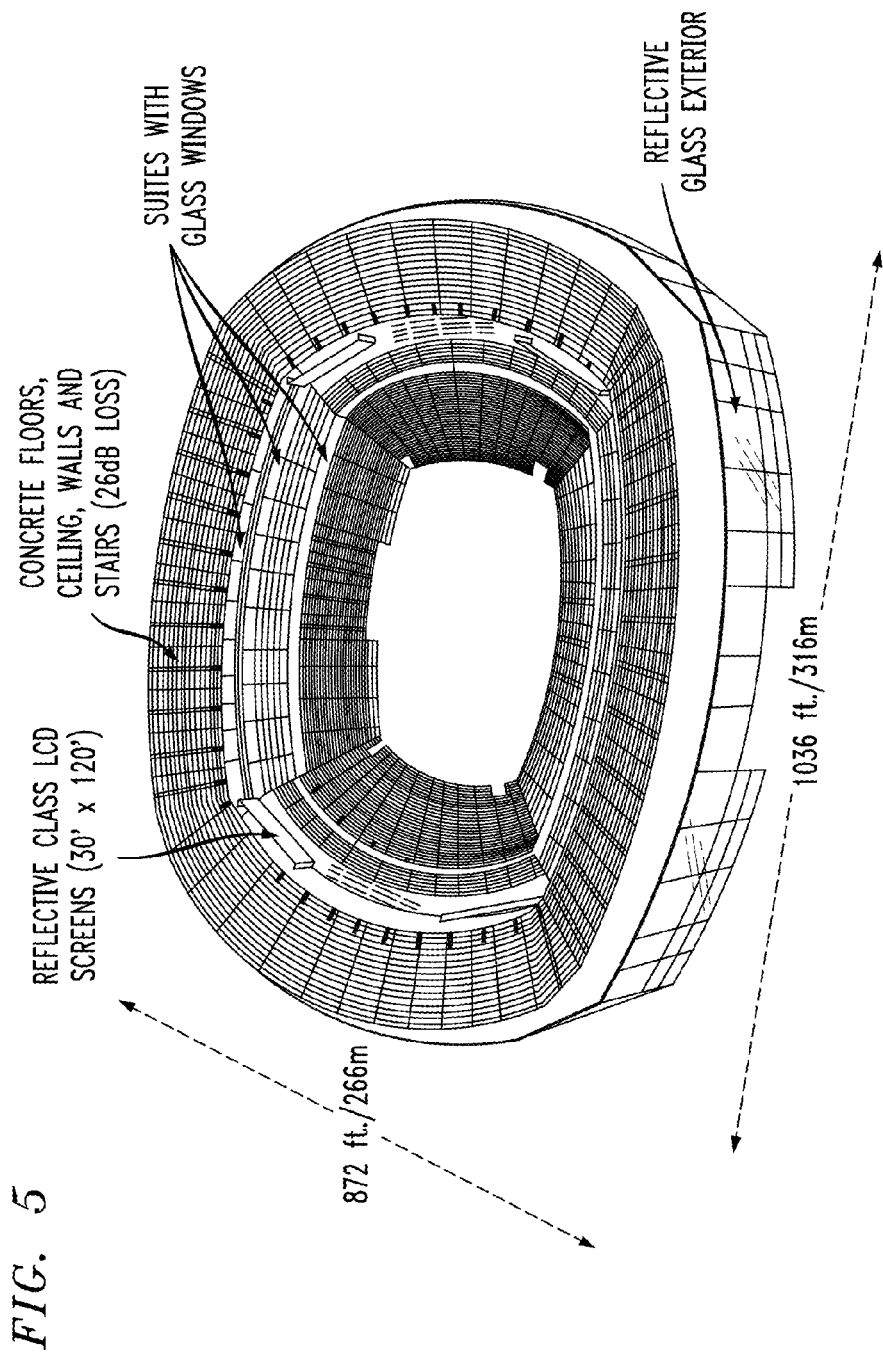
FIG. 5 represents a realistic 3D model of a large football stadium.

The following simulation results are provided to support the ideas of this patent application:

FIG. 5 represents a realistic 3D model of a large football stadium where two deployments with sixty-two (62) and one-hundred-twenty-four (124) Wi-Fi Aps have been analyzed. The stadium has the following dimensions: 316 m length, 266 m width and 52 m height. The exterior of the stadium is covered with reflective glass, which has a 5 dB propagation loss at 2.1 GHz. Floors, ceilings, walls and stairs are built of concrete, which introduces 26 dB propagation loss. The model includes three concourses with corresponding outdoor seating areas. The stadium has suites with glass windows which are also modeled, as well as a big reflective glass screen (approximate dimensions 10 m×40 m), which impacts the propagation conditions. Deployments with 62 and 124 Wi-Fi APs respectively have been analyzed using the realistic 3D model of a large football stadium illustrated in FIG. 5.

Figure 6A:
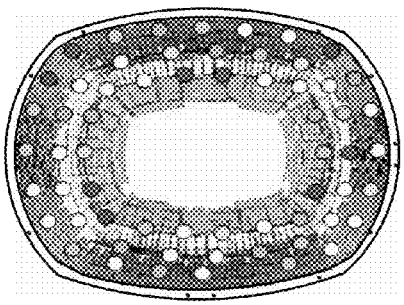
FIG. 6A illustrates an example distribution of a sixty-two (62) Wi-Fi AP deployment in a stadium.

FIG. 6A illustrates an example distribution of a sixty-two (62) Wi-Fi AP deployment in a stadium. FIG. 6C illustrates an example distribution of a one-hundred-twenty-four (124) Wi-Fi AP deployment in a stadium. In FIGS. 6A and 6C, each circle indicates an AP location and the color of the circle represents the channel it is operating. The distributions of Wi-Fi APs for both deployments, along with allocated channels represented using different colors, are illustrated on FIGS. 6A (62 Wi-Fi APs) and 6C (124 Wi-Fi APs). Twelve (12) independent 20 MHz channels in 5 GHz spectrum have been used, each represented by different color. These figures provide the Wi-Fi APs frequency pattern for the respective deployments.

Figure 6B:
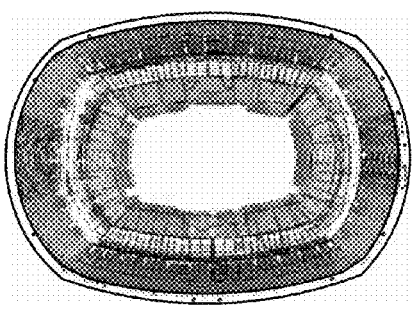
FIG. 6B illustrates a 2D map of the received power for the example distribution of FIG. 6A.
Figure 6C:
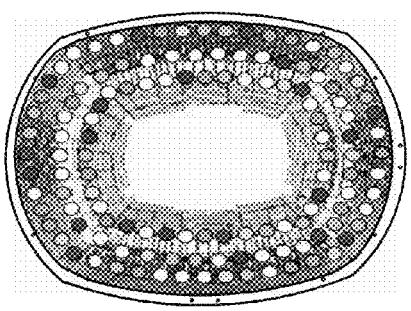
FIG. 6C illustrates an example distribution of a one-hundred-twenty-four (124) Wi-Fi AP deployment in a stadium.
Figure 6D:
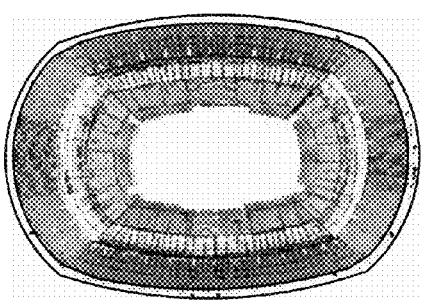
FIG. 6D illustrates a 2D map of the received power for the example distribution of FIG. 6C.

FIG. 6B illustrates a 2D map of the received power for the distribution of the sixty-two (62) Wi-Fi AP deployment illustrated in FIG. 6A. FIG. 6D illustrates a 2D map of the received power for the distribution of the one-hundred-twenty-four (124) Wi-Fi AP deployment illustrated in FIG. 6B. Each Wi-Fi device uses a 10 mW transmit power level. Wi-Fi APs were equipped with directional antennas oriented to confine the radiated energy into a limited service area. Each 2D maps compares the received power for the deployment. Thus, FIGS. 6A-6D illustrate: a) sixty-two (62) Wi-Fi APs frequency pattern (each circle indicates an AP location and the color represents the channel it is operating); b) sixty-two (62) Wi-Fi APs 2D received power map; c) the one-hundred-twenty-four (124) Wi-Fi APs frequency pattern; b) the one-hundred-twenty-four (124) Wi-Fi APs 2D received power map.

Figure 7A:
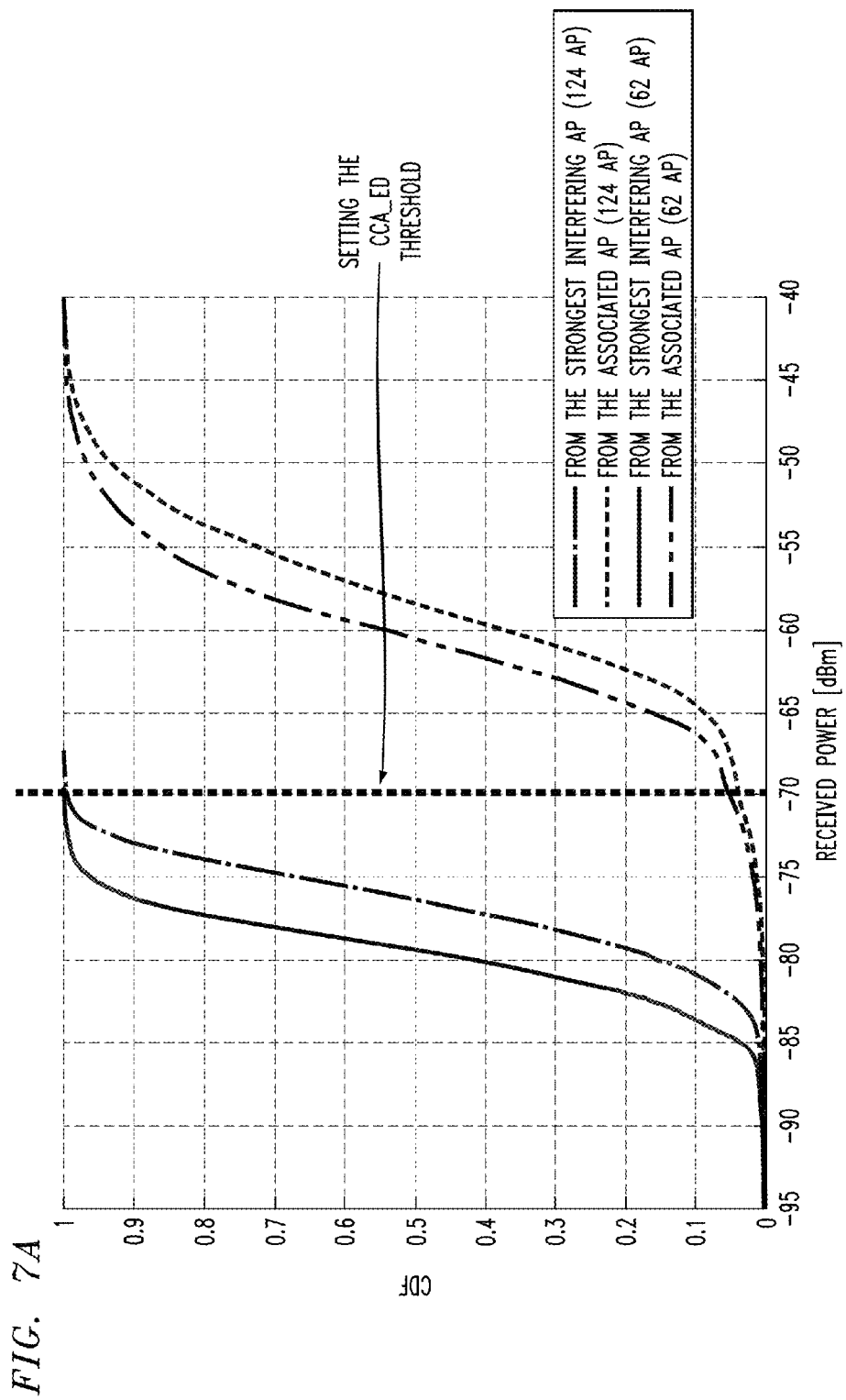
FIGS. 7A-7B illustrate CDFs of received power from the serving Wi-Fi AP and the strongest interfering Wi-Fi AP at each receiver location for the sixty-two (62) Wi-Fi AP deployment and the one-hundred-twenty-four (124) Wi-Fi AP deployment with FIG. 7A illustrating a first setting of the CCA-ED threshold and FIG. 7B illustrating a second setting of the CCA-ED threshold.
Figure 7B:
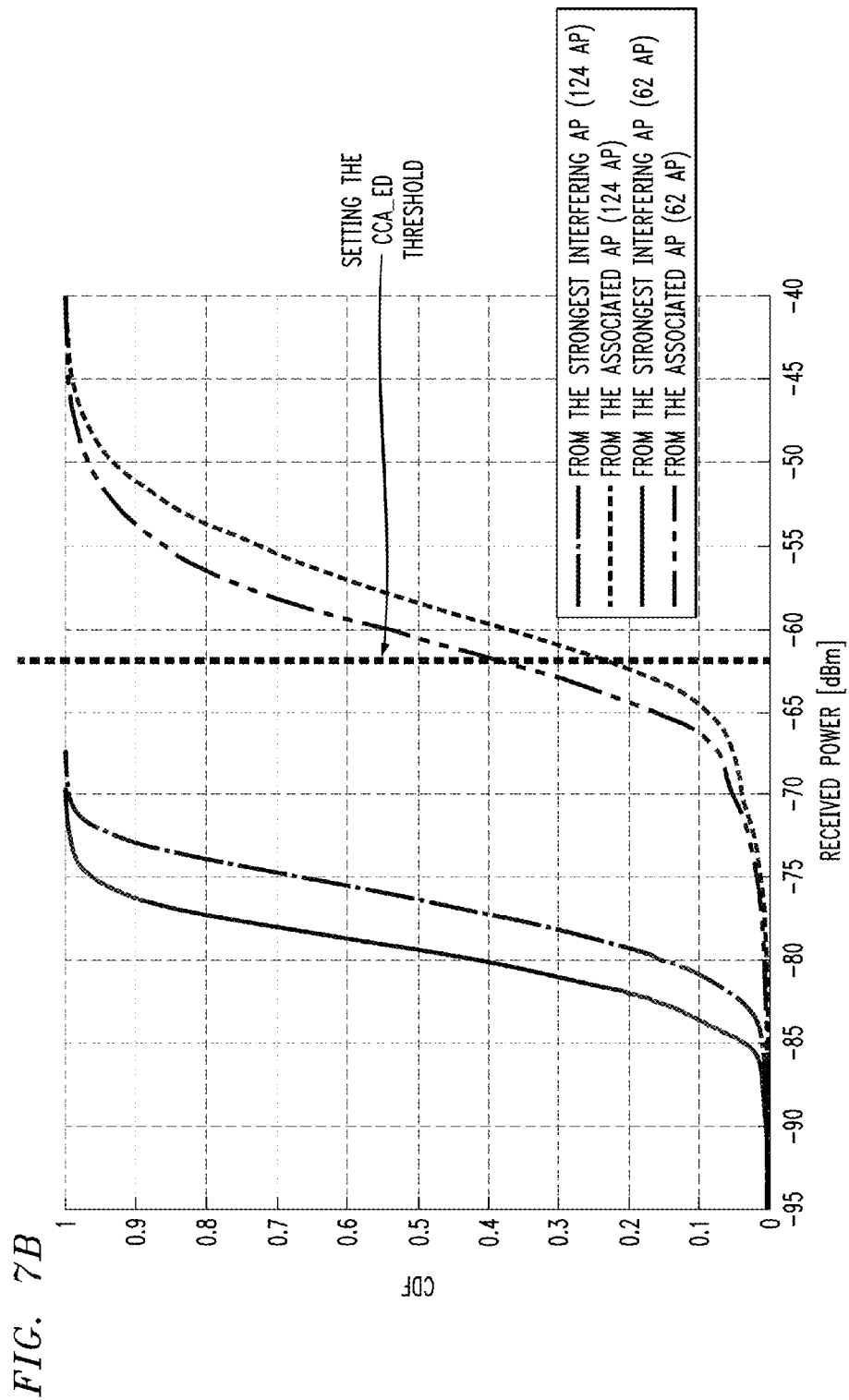

FIG. 7A illustrates CDFs of received power from the serving Wi-Fi AP (M1) and the strongest interfering Wi-Fi AP (M2) at each receiver location for the sixty-two (62) Wi-Fi AP deployment and the one-hundred-twenty-four (124) Wi-Fi AP deployment. FIG. 7A shows that during a steady state condition (a snapshot in time), 95% of receiver locations receive a signal stronger than −70 dBm and 100% of the interfering signals are weaker than −70 dBm, for both deployments under analysis. Hence, as shown in FIG. 7A, setting the CCA-ED threshold close to −70 dBm for these scenarios would eliminate most of the issues related to the "strongest last collision". FIG. 7B shows that during a steady state condition (a snapshot in time), for the given setting of the CCA-ED Threshold approximately seventy-five percent (75%) and sixty-two percent (62%) respectively of receiver locations receive a signal stronger than ~−62 dBm and 100% of the interfering signals are weaker than −70 dBm, for the sixty-two (62) and one-hundred-twenty-four (124) AP deployments under analysis. Note, according to FIG. 7B, while all interfering signals are not detected, there is a percentage of Wi-Fi clients and their serving Wi-Fi APs which will ignore each other's transmission which may lead to significant temporary outage as explained in the description related to operation 418 of FIG. 5.

Figure 8A:
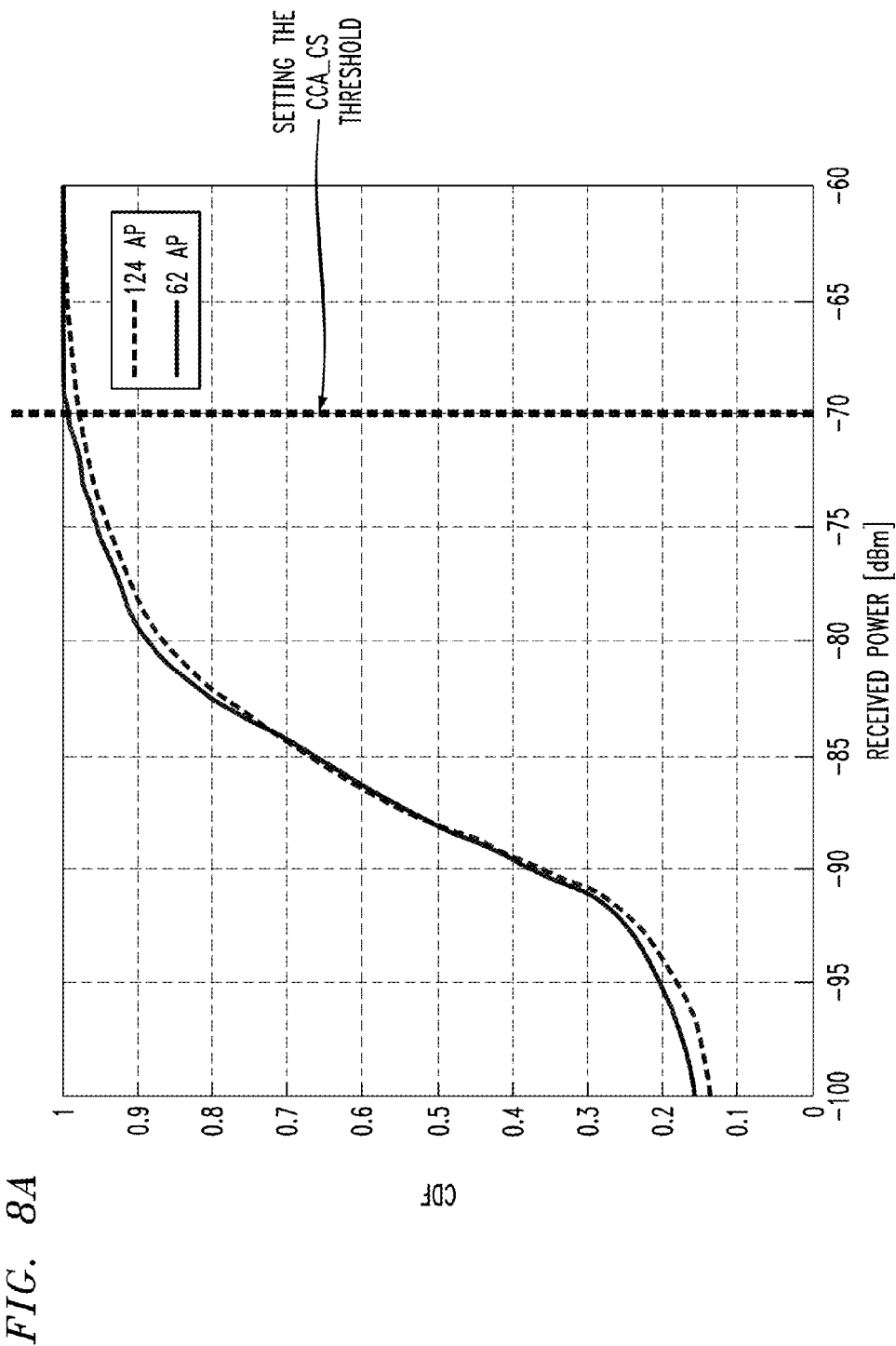
FIGS. 8A-8B show the cumulative distribution function (CDF) of received signals between Wi-Fi APs during a steady state condition (a snapshot in time) with FIG. 8A illustrating a first setting of the CCA-CS threshold and FIG. 8B illustrating a second setting of the CCA-CS threshold.
Figure 8B:
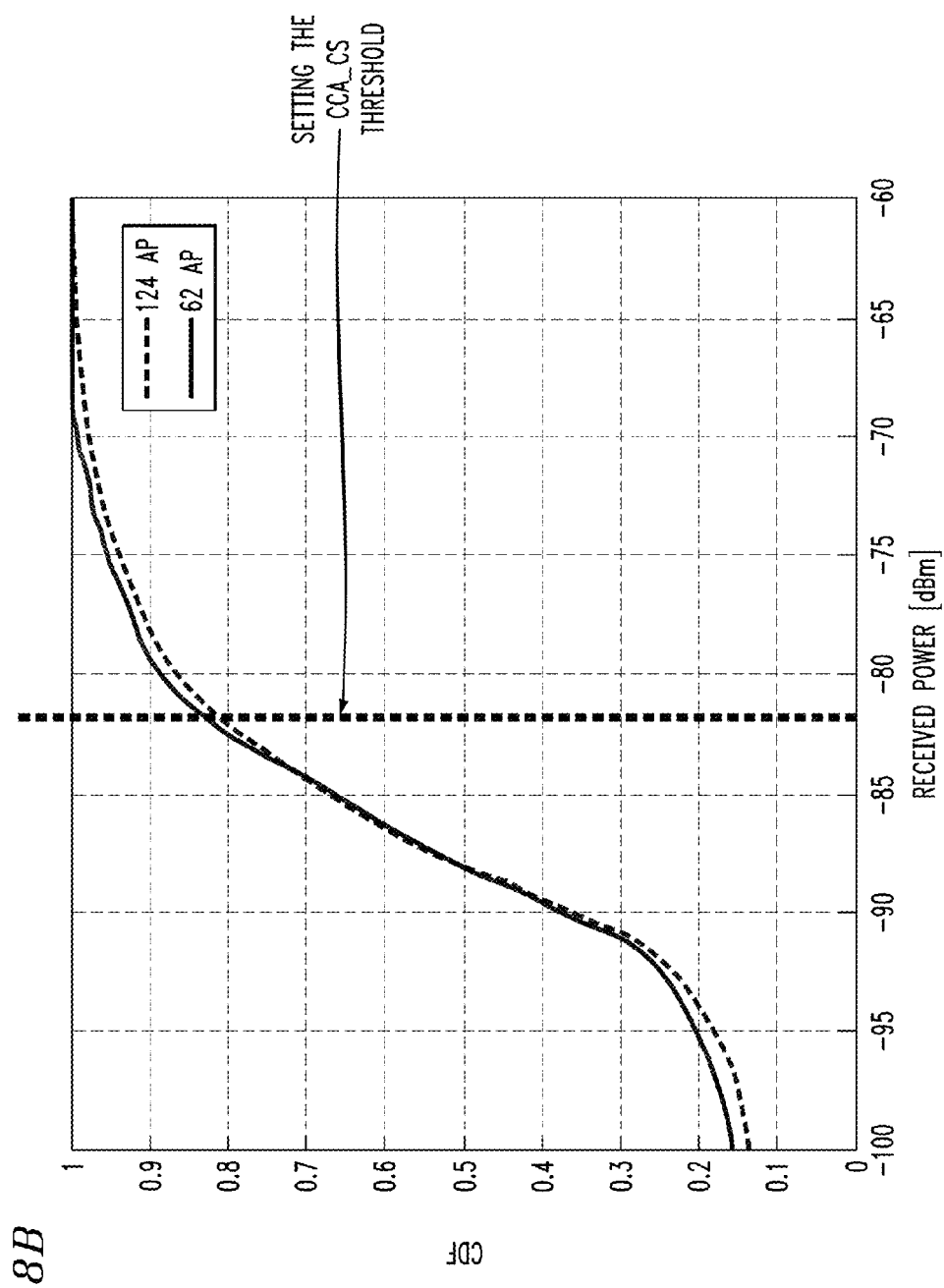

FIGS. 8A-8B shows the cumulative distribution function (CDF) of received signals between Wi-Fi APs (M3) during a steady state condition (a snapshot in time). Due to deployment choices, each Wi-Fi AP receives at most −70 dBm from an interfering Wi-Fi AP. Setting the CCA-CS threshold to −70 dBm for these scenarios as illustrated in FIG. 8A would prevent the Wi-Fi APs from deferring the transmission to each other. As shown in FIG. 8A's CDFs of received power between Wi-Fi APs in the same channel, ninety-eight-percent (98%) of the Wi-Fi APs receive a signal with weaker than −70 dBm from another Wi-Fi AP for a first setting of the CCA-CA Threshold. Note that although the CDF curves in FIGS. 7A and 8A for the deployments with sixty-two (62) and one-hundred-twenty-four (124) AP are different, the selected CCA-ED and CCA-CS thresholds would satisfy quite similarly the two deployments.

FIG. 8B shows an alternative setting of −82 dBm for CCA-CS Threshold which results in approximately eighty percent (80%) of the Wi-Fi APs receiving a signal with weaker than −82 dBm from another Wi-Fi AP for this second first setting of the CCA-CA Threshold. This means approximately (twenty percent (20%) of the APs will defer transmission to each other resulting in reduced throughput.

FIG. 9 shows the distribution of achievable user throughputs for the two deployments with sixty-two (62) and one-hundred-twenty-four (124) Wi-Fi AP given the parameter setting for CCA-ED=−70 dBm and CCA-CS=−70 dBm.

FIG. 10 depicts a high-level block diagram of a computer suitable for use in performing the operations and methodology described herein. The computer 1000 includes a processor 1002 (e.g., a central processing unit (CPU) or other suitable processor(s)) and a memory 1004 (e.g., random access memory (RAM), read only memory (ROM), and the like).

The computer 1000 also may include a cooperating module/process 1005. The cooperating process 1005 can be loaded into memory 1004 and executed by the processor 1002 to implement functions as discussed herein and, thus, cooperating process 1005 (including associated data structures) can be stored on a computer readable storage medium, e.g., RAM memory, magnetic or optical drive or diskette, and the like.

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1000 depicted in FIG. 10 provides a general architecture and functionality suitable for implementing functional elements described herein or portions of functional elements described herein. For example, the computer 1000 provides a general architecture and functionality suitable for implementing one or more of a UE, a Wi-Fi client, a Wi-Fi Access Point, a WI-FI controller, a 3GPP cell, small cell, SGW, MME, PGW, WLAN GW, PCRF/ANDSF, network element, network entity which hosts the methodology for described herein according to the principles of the invention, and the like. For example, a processor of a router, Gateway or other network node in communication a Gateway may be configured to provide functional elements that implement in the Wi-Fi access optimization functionality discussed herein.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of one or more of the methods described herein. The program storage devices may be non-transitory media, e.g., digital memories, magnetic storage media such as a magnetic disks or tapes, hard drives, or optically readable digital data storage media. In one or more embodiments, tangible medium excluding signals may include a set of instructions which when executed are operable to perform one or more of the descried methods. The provided embodiments are also intended to be embodied in computers programmed to perform said steps of methods described herein.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms 'a' or 'an', as used herein, are defined as one or more than one. The term "plurality", as used herein, is defined as two or more than two. The term "another", as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

As used herein, the term "3GPP cell" may be considered synonymous to, and may hereafter be occasionally referred to as a NodeB, eNodeB, base station, transceiver station, base transceiver station (BTS), small cell, etc., and describes a transceiver in communication with and providing wireless resources to users in a geographical coverage area. As discussed herein, eNBs may have all functionality associated with conventional, well-known base stations in addition to the capability and functionality to perform the methods discussed herein for tuning Wi-Fi parameters such as the CCA-ED and CCA-CS thresholds and communicating with a Wi-Fi device using a Wi-Fi technology based wireless access system.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to eNB (or network), whereas downlink (or forward link) transmissions refer to transmissions from eNB (or network) to UE.

According to example embodiments, the Packet Data Network Gateways (PGW), Serving Gateways (SGW), Mobility Management Entities (MME), UEs, 3GPP cells, WI-FI Access Points, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein a MME, PGW and/or SGW may be any well-known gateway or other physical computer hardware system. The MME, PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, PGW, SGW, eNBs, etc.); and to transmit/receive (wireline or wirelessly) controls signals via a control plane or interface to/from other network elements.

The MME, PGW and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The Wi-Fi Access Points and 3GPP cells, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more switches, gateways, MMEs, controllers, other Wi-Fi Access Points, other eNBs, UEs, etc.

As discussed herein, the PGW, SGW, and MME may be collectively referred to as Evolved Packet Core network elements or entities (or core network elements or entities). The eNB may be referred to as a radio access network (RAN) element or entity.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

The network node which hosts the methodology described herein may reside in the WLAN GW, MME, PCPRF/ANDSF, or other network node of the 3GPP core.

The invention claimed is:

1. In a communication system including a plurality of Wi-Fi clients operably connected to one or more Wi-Fi Access Points for connection to a core network, the Wi-Fi Access Points operably connected to a Wi-Fi controller, a method comprising the Wi-Fi controller:
    receiving M1 and M2 associated with a plurality of Wi-Fi clients,
        wherein, for a respective Wi-Fi client configured to operate on a channel:
            M1 is a Received Signal Strength Indication (RSSI) from a serving Wi-Fi Access Point, measured by the Wi-Fi client, and
            M2 is an aggregated level of interference from other than the serving Wi-Fi Access Point, measured by the Wi-Fi client;
    receiving M3 associated with a plurality of Wi-Fi Access Points,
        wherein, for a respective Wi-Fi Access Point:
            M3 is a level of interference measured by the Wi-Fi Access Point received from other of the plurality of Wi-Fi Access Points operating on the channel;
    generating distributions of M1, M2 and M3 including progressive updates of M1, M2 and M3; and
    setting and updating a Clear Channel Assessment-Energy Detection (CCA-ED) threshold and a Clear Channel Assessment-Carrier Sense (CCA-CS) threshold based on the distributions of M1, M2 and M3.

2. The method of claim 1 wherein M1, M2 and M3 are average measurements over a sampling interval.

3. The method of claim 1 wherein M2 includes at least one of the group consisting of an aggregated level of interference from one or more other Wi-Fi APs of the plurality of Wi-Fi Access Points which are causing interference, a level of interference from a strongest interferer, and other measurable interference from an interferer received on the channel by the respective Wi-Fi client.

4. The method of claim 1 wherein M3 includes other measurable interference from an interferer received on the channel by the respective Wi-Fi Access Point.

5. The method of claim 1 wherein setting the CCA-ED threshold and the CCA-CS threshold comprises:
    based on the distribution of M1 and M2, determining if there exists a minimum CCA-ED threshold setting such that at most an ED outage target percentage of receiver locations receives a desired signal level that is under the minimum CCA-ED threshold setting;
    if the minimum CCA-ED threshold setting is determined not to exist, generating an alarm;
    if the minimum CCA-ED threshold setting is determined to exist, based on the distribution of M3, determining a CCA-CS threshold setting such that a CS outage target percentage of receiver locations receives an interference signal that is under the CCA-CS threshold setting.

6. The method of claim 5 wherein setting the CCA-ED threshold and the CCA-CS threshold comprises:
    constructing Signal Interference to Noise Ratio (SINR) and data rate distributions using an available set of interferers;
    making a first determination of whether an acceptable performance level is achieved based on the SINR and data rate distributions; and
    performing one or more actions based on the first determination.

7. The method of claim 6 wherein the acceptable performance level is based on a threshold percentage of users receiving Wi-FI service or operating above a Signal to Noise Ratio (SNR) level.

8. The method of claim 6 wherein the one or more actions based on the first determination is at least one of the group consisting of determining a feasibility of adjusting at least one of the CCA-ED threshold or the CCA-CS threshold, adjusting at least one of the CCA-ED threshold or the CCA-CS threshold, generating an alarm, and transmitting the CCA-ED threshold and the CCA-CS threshold to one or more Wi-Fi Access Point of the plurality of Wi-Fi Access Points and one or more Wi-Fi client of the plurality of Wi-Fi clients.

9. The method of claim 1 further comprising:
transmitting the CCA-ED threshold and the CCA-CS threshold to one or more Wi-Fi Access Point of the plurality of Wi-Fi Access Points and one or more Wi-Fi client of the plurality of Wi-Fi clients.

10. In a communication system including a plurality of Wi-Fi clients operably connected to one or more Wi-Fi Access Points for connection to a core network, a Wi-Fi controller including a processor and an associated memory, the processor configured to
receive M1 and M2 associated with a plurality of Wi-Fi clients,
wherein, for a respective Wi-Fi client configured to operate on a channel:
M1 is a Received Signal Strength Indication (RSSI) from a serving Wi-Fi Access Point, measured by the Wi-Fi client, and
M2 is an aggregated level of interference from other than the serving Wi-Fi Access Point, measured by the Wi-Fi client;
receive M3 associated with a plurality of Wi-Fi Access Points,
wherein, for a respective Wi-Fi Access Point:
M3 is a level of interference measured by the Wi-Fi Access Point received from other of the plurality of Wi-Fi Access Points operating on the channel;
generate distributions of M1, M2 and M3 including progressive updates of M1, M2 and M3; and
set and update a Clear Channel Assessment-Energy Detection (CCA-ED) threshold and a Clear Channel Assessment-Carrier Sense (CCA-CS) threshold based on the distributions of M1, M2 and M3.

11. The Wi-Fi controller of claim 10 wherein M1, M2 and M3 are average measurements over a sampling interval.

12. The Wi-Fi controller of claim 10 wherein M2 includes at least one of the group consisting of an aggregated level of interference from one or more other Wi-Fi APs of the plurality of Wi-Fi Access Points which are causing interference, a level of interference from a strongest interferer, and other measurable interference from an interferer received on the channel by the respective Wi-Fi client.

13. The Wi-Fi controller of claim 10 wherein M3 includes other measurable interference from an interferer received on the channel by the respective Wi-Fi Access Point.

14. The Wi-Fi controller of claim 10 wherein to set CCA-ED threshold and the CCA-CS threshold, the processor is configured to:
based on the distribution of M1 and M2, determine if there exists a minimum CCA-ED threshold setting such that at most an ED outage target percentage of receiver locations receives a desired signal level that is under the minimum CCA-ED threshold setting;
when the minimum CCA-ED threshold setting is determined not to exist, generate an alarm;
when the minimum CCA-ED threshold setting is determined to exist, based on the distribution of M3, determine a CCA-CS threshold setting such that a CS outage target percentage of receiver locations receives an interference signal that is under the CCA-CS threshold setting.

15. The Wi-Fi controller of claim 14 wherein to set the CCA-ED threshold and the CCA-CS threshold, the processor is configured to:
construct Signal Interference to Noise Ratio (SINR) and data rate distributions using an available set of interferers;
make a first determination of whether an acceptable performance level is achieved based on the SINR and data rate distributions; and
perform one or more actions based on the first determination.

16. The Wi-Fi controller of claim 15 wherein the acceptable performance level is based on a threshold percentage of users receiving Wi-FI service or operating above a Signal to Noise Ratio (SNR) level.

17. The Wi-Fi controller of claim 15 wherein the one or more actions based on the first determination is at least one of the group consisting of determining a feasibility of adjusting at least one of the CCA-ED threshold or the CCA-CS threshold, adjusting at least one of the CCA-ED threshold or the CCA-CS threshold, generating an alarm, and transmitting the CCA-ED threshold and the CCA-CS threshold to one or more Wi-Fi Access Point of the plurality of Wi-Fi Access Points and one or more Wi-Fi client of the plurality of Wi-Fi clients.

18. The Wi-Fi controller of claim 10 wherein the processor is configured to
transmit the CCA-ED threshold and the CCA-CS threshold to one or more Wi-Fi Access Point of the plurality of Wi-Fi Access Points and one or more Wi-Fi client of the plurality of Wi-Fi clients.

19. A system comprising:
a plurality of Wi-Fi clients;
a plurality of Wi-Fi Access Points; and
a Wi-Fi controller for communicating with the plurality of Wi-Fi clients and the plurality of Wi-Fi Access Points, the Wi-Fi controller configure to
receive M1 and M2 associated with a plurality of Wi-Fi clients,
wherein, for a respective Wi-Fi client configured to operate on a channel:
M1 is a Received Signal Strength Indication (RSSI) from a serving Wi-Fi Access Point, measured by the Wi-Fi client, and
M2 is an aggregated level of interference from other than the serving Wi-Fi Access Point, measured by the Wi-Fi client;
receive M3 associated with a plurality of Wi-Fi Access Points,
wherein, for a respective Wi-Fi Access Point:
M3 is a level of interference measured by the Wi-Fi Access Point received from other of the plurality of Wi-Fi Access Points operating on the channel;
generate distributions of M1, M2 and M3 including progressive updates of M1, M2 and M3;
set and update a Clear Channel Assessment-Energy Detection (CCA-ED) threshold and a Clear Channel Assessment-Carrier Sense (CCA-CS) threshold based on the distributions of M1, M2 and M3; and
transmit the CCA-ED threshold and the CCA-CS threshold to one or more Wi-Fi Access Point of the plurality of Wi-Fi Access Points and one or more Wi-Fi client of the plurality of Wi-Fi clients.

* * * * *